(12) United States Patent
Kuwabara et al.

(10) Patent No.: US 8,497,869 B2
(45) Date of Patent: Jul. 30, 2013

(54) CHARACTER GENERATING SYSTEM, CHARACTER GENERATING METHOD, AND PROGRAM

(71) Applicant: Altron Corporation, Shinagawa-ku (JP)

(72) Inventors: Masao Kuwabara, Tokyo (JP); Naoto Kominato, Shirakawa (JP); Kazumitsu Moriyama, Kagoshima (JP)

(73) Assignee: Altron Corporation, Tokyo (JP)

( * ) Notice: Subject to any disclaimer, the term of this patent is extended or adjusted under 35 U.S.C. 154(b) by 0 days.

(21) Appl. No.: 13/693,623

(22) Filed: Dec. 4, 2012

(65) Prior Publication Data

US 2013/0120425 A1    May 16, 2013

Related U.S. Application Data

(63) Continuation of application No. PCT/JP2010/059967, filed on Jun. 11, 2010.

(51) Int. Cl.
| G09G 5/00 | (2006.01) |
| G09G 5/02 | (2006.01) |
| H04N 1/40 | (2006.01) |
| H04N 1/46 | (2006.01) |
| G06F 3/00 | (2006.01) |
| G06F 3/048 | (2006.01) |

(52) U.S. Cl.
USPC ............ 345/581; 345/582; 345/589; 345/467; 345/551; 345/619; 358/448; 358/530; 358/537; 358/538; 715/700; 715/764; 715/705; 715/770

(58) Field of Classification Search
CPC ............................ G06T 11/20; G06K 9/00221
USPC ......... 345/418–420, 581–582, 589, 593–594, 345/619–621, 624, 630, 636, 646, 467–470, 345/473, 501, 551; 348/207.1, 231.3; 358/527, 358/530, 537–538, 540, 448, 452–453; 399/1–2, 6; 382/276, 282, 305, 307; 715/700, 715/705–706, 764, 769–770, 823, 965; 463/30–32, 43
See application file for complete search history.

(56) References Cited

U.S. PATENT DOCUMENTS

| 6,828,972 | B2 * | 12/2004 | Zhang et al. | 345/473 |
| 6,919,892 | B1 * | 7/2005 | Cheiky et al. | 345/473 |
| 2009/0252435 | A1 * | 10/2009 | Wen et al. | 382/284 |
| 2010/0007665 | A1 * | 1/2010 | Smith et al. | 345/473 |
| 2011/0057954 | A1 * | 3/2011 | Kobayashi et al. | 345/647 |
| 2012/0139920 | A1 * | 6/2012 | Kuwabara et al. | 345/426 |

FOREIGN PATENT DOCUMENTS

| JP | 2000-235656 A1 | 8/2000 |
| JP | 2001-222725 A1 | 8/2001 |

OTHER PUBLICATIONS

PCT. "International Search Report for PCT/JP2010/059967", Jul. 13, 2010.

* cited by examiner

*Primary Examiner* — Wesner Sajous
(74) *Attorney, Agent, or Firm* — Manabu Kanesaka

(57) ABSTRACT

A character generating system (10) includes a pickup image information acquiring unit (14), a face part texture generating unit (15), a shape model generating unit (16), and a texture pasting unit (17). The face part texture generating unit (15) has the function of generating part textures that correspond to face parts and are pasted to a head portion shape model of a character (70), which will become an anime-like portrait based on face pickup image information of an object, and includes a characteristic point extracting unit (151), a part selecting unit (152), a flesh color setting unit (153), and a part arrangement setting unit (154).

23 Claims, 9 Drawing Sheets

FIG. 11A  FIG. 11B  FIG. 11C
  
FIG. 12A  FIG. 12B  FIG. 12C
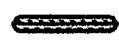  

CHARACTER GENERATING SYSTEM, CHARACTER GENERATING METHOD, AND PROGRAM

RELATED APPLICATIONS

The present application is Continuation of National Phase of International Application No. PCT/JP2010/059967 filed on Jun. 11, 2010.

TECHNICAL FIELD

The present invention relates to a character generating system, a character generating method, and a program that generates a character in a virtual space realized by using a computer. In particular, the present invention relates to a character generating system, a character generating method, and a program that generates, as an animated composite drawing (anime-like portrait) based on face pickup image information of an object, a face of a character in a virtual space realized by using a portable video-game console.

BACKGROUND ART

To generate a character to have displayed in the virtual space of the game or similar software using a portable video game console or similar electronic device, the user first selects a character from a plurality of characters prepared in advance. The selected character is displayed in the virtual space as the character in use.

This proposal also includes an image processing apparatus and an image processing method that attach an image to the character displayed in the virtual space. The image is taken by a digital camera or similar tool and saved by the user. For example, Patent Document 1 discloses an image processing apparatus and an image processing method that take two-dimensional image information and graft it onto a three-dimensional virtual figure. The image processor extracts two-dimensional image information in a predetermined region from the provided two-dimensional image information by using a frame that designates a clipping region that has a gauge establishing point-to-point correspondences with characteristic points on a three-dimensional virtual figure. The image processor then pastes the extracted two-dimensional image information onto the three-dimensional virtual figure.

PRIOR ART DOCUMENTS

Patent Document

Patent Document 1: Japanese Patent Application Laid-open No. 2000-235656

SUMMARY OF INVENTION

Technical Problem to be Solved by the Invention

However, as disclosed in Patent Document 1, when two-dimensional image information (face pickup image information) of the face portion from two-dimensional image information photographed with a digital camera or similar tool is extracted and added to a virtual three-dimensional object (head portion shape model), the amount of data needed to generate a character increases. In a portable video-game console or similar electronic device with a small storage capacity, generating a character takes a long time, processing speed decreases when the generated character is moved in a virtual space, and the number of characters that can appear is disadvantageously limited. Furthermore, direct display of the photographic subject's face as the face of a character may not be desirable, or such display may be precluded by the protection of personal data.

The present invention has been made to solve the problems described above, and has as its object to provide a character generating system, a character generating method, and a program that can easily generate, as an "anime-" like portrait (caricature- or cartoon-like portrait) based on face pickup image information of an object, a face of a character in a virtual space realized by using a computer such as a portable video-game console.

Solution to Problem

The following invention will be provided to solve the above conventional problems. Unit, as used below, should be understood to encompass both physical devices and methods or sections of programming that accomplish a specific purpose.

The first element of the present invention provides a character generating system that, by using a computer, generates a face as an anime-like portrait based on face pickup image information for a character displayed on a display unit as the presence in a virtual space. The above computer includes: a pickup image acquiring unit that acquires the face pickup image information of the object from pickup image information of the object stored in a predetermined storing unit; a face part texture generating unit that extracts characteristic points from predetermined face parts and color information from predetermined pixels of the face pickup image information of the object acquired by the pickup image acquiring unit, sets lookalike flesh color information for a head portion texture of the character similar to the flesh color of the photographed object on the basis of the extracted color information of the predetermined pixels, and also selects lookalike anime-like parts (caricature- or cartoon-like parts) similar to the corresponding face parts of the object on the basis of the extracted characteristic points to generate a face part texture corresponding to the face part by setting an arrangement of the selected lookalike anime-like parts; a shape model generating unit that generates the head portion shape model on the basis of the characteristic points of the predetermined face parts; and a texture pasting unit that performs the step to replace color information of the head portion texture, excluding the face part textures to be pasted to the head portion shape model of the character, with the lookalike flesh color information set by the face part texture generating unit, as well as the step to paste the face part textures generated by the face part texture generating unit to the head portion shape model of the character.

The second element of the present invention provides a character generating system wherein the face part texture generating unit of the character generating system, as described in the first element of the present invention, includes: a characteristic point extracting unit that acquires position information for the characteristic points of the predetermined face parts from the face pickup image information of the object acquired by the pickup image acquiring unit and acquires the color information of the predetermined pixels; apart selecting unit that selects, on the basis of the position information of the characteristic points acquired by the characteristic point extracting unit, the lookalike anime-like part similar to a shape on the face of the object from a plurality of anime-like parts prepared in advance to correspond to the face parts; a flesh color setting unit that selects, on the basis of the color information of the predetermined pixels acquired by the characteristic point extracting unit, lookalike flesh color information similar to the flesh color of the object from a plurality of flesh color settings prepared in advance; and a part arrangement setting unit that sets, on the basis of the position information of the characteristic points acquired by the characteristic point extracting unit, an arrangement of the lookalike anime-like parts corresponding to the face parts selected by the part selecting unit and generates the face part texture on the basis of the set arrangement of the lookalike anime-like parts.

The third element of the present invention provides a character generating system wherein the part selecting unit of the character generating system, described in the second element of the present invention, converts position information of the characteristic points of either of the left or right basic face parts, when the face parts are composed of two left and right basic parts, into position information in which the characteristic points are moved to positions axisymmetrically about a face center line, estimates a shape of the basic face parts from an average of the position data of the characteristic points of the left and right basic face parts, and selects the lookalike anime-like part corresponding to the estimated shape of the basic face parts from the plurality of anime-like parts. When the face part is composed of one basic face part, the unit estimates a shape of the face part from position information of the characteristic points of the face part and selects the lookalike anime-like part corresponding to the estimated shape of the face part from the plurality of anime-like parts.

The fourth element of the present invention provides a character generating system wherein the part arrangement setting unit of the character generating system, described in the second and third elements of the present invention, arranges the lookalike anime-like part of a nose and the lookalike anime-like part of a mouth at predetermined positions in the face part textures of the nose and the mouth on the above face part texture that corresponds to the face part with positions set in advance for pasting to the head portion shape model. It also arranges the lookalike anime-like parts of the left and right eyes axisymmetrically about the face center line at an interval between the left and right eyes calculated from the position information of the characteristic points at predetermined vertical positions in the face part texture of the eyes, arranges the lookalike anime-like parts of left and right eyebrows axisymmetrically about the face center line at predetermined crosswise positions in the face part texture of the eyebrows and at vertical positions calculated from the position information of the characteristic points, and generates the face part textures corresponding to the nose, the mouth, the eyes, and the eyebrows on the basis of the arrangements of the lookalike anime-like parts corresponding to nose, mouth, eyes, and eyebrows.

The fifth element of the present invention provides a character generating system wherein the part arrangement setting unit of the character generating system, described in the second and third elements of the present invention, for the face part texture corresponding to a face part for which a position pasted to the head portion shape model is set in advance, calculates the positions of the lookalike anime-like parts in the face part texture corresponding to the face part on the basis of the position information of the characteristic points of face parts acquired by the characteristic points extracting unit, and generates the face part texture on the basis of the calculated positions of the lookalike anime-like parts.

The sixth element of the present invention provides a character generating system wherein the part arrangement setting unit of the character generating system, described in the fourth and fifth elements of the present invention, selects a lookalike model face part texture with a similar arrangement of lookalike anime-like parts that corresponds to the face part from a plurality of model face part textures corresponding to face parts, and sets the selected lookalike model face part texture as the face part texture.

The seventh element of the present invention provides a character generating system wherein the shape model generating unit of the character generating system, described in any one of the first to sixth elements of the present invention, selects a basic head portion shape model similar to the facial bone structure on the basis of the characteristic points of the facial bone structure from a plurality of bone structure shape models prepared in advance to correspond to a facial bone structure. It also selects lookalike part shape models similar to the predetermined face parts on the basis of the characteristic points of the predetermined face parts from a plurality of part shape models prepared in advance to correspond to a predetermined face part, excluding the facial bone structure. It then generates the head portion shape model by combining the selected basic head portion shape model and the lookalike part shape models.

The eighth element of the present invention provides a character generating system wherein the shape model generating unit of the character generating system, described in any one of the first to sixth elements of the present invention, selects the head portion shape model similar to the facial bone structure on the basis of the characteristic points of the facial bone structure from a plurality of reference shape models prepared in advance to correspond to a facial bone structure.

The ninth element of the present invention provides a character generating system wherein, in the character generating system described in any one of the first to eighth elements of the present invention, the computer further includes a display control unit that causes the display unit to display face arrangement guide information that shows the arrangement of the predetermined face parts, as well as the original object on the display unit. It also includes an image pickup control unit that causes an image pickup unit to pick up an image of the object and to store the pickup image information of the object in the predetermined storing unit. The pickup image acquiring unit connects the image pickup control unit to the display control unit and acquires the face pickup image information of the object by picking up the image of the object on the basis of the face arrangement guide information from the pickup image information of the object stored in the predetermined storing unit while displaying the face arrangement guide information and the object on the display unit.

The tenth element of the present invention provides a character generating system wherein, in the character generating system described in any one of the first to ninth aspects of the present invention, the computer further includes an input control unit that controls an input unit, causing it to take in various pieces of information, including the pickup image information of the object, as input information and to store the pickup image information of the object in the predetermined storing unit. The pickup image acquiring unit connects the input control unit to the display control unit and acquires the face pickup image information of the object based on the face arrangement guide information from the pickup image information of the object stored in the predetermined storing unit while displaying the face arrangement guide information and the input pickup image information of the object on the display unit.

The eleventh element of the present invention provides a character generating system, described in the ninth or tenth elements of the present invention, wherein the predetermined face parts, the arrangement of which is represented by the face arrangement guide information, include at least a facial bone structure.

As noted in the first element of the present invention, there is provided a character generating method that uses a computer to generate a face of a character, displayed on a display unit as the presence in a virtual space, as an anime-like portrait based on face pickup image information of an object. For this, the computer performs the following: (a) a step of acquiring the face pickup image information of the object from pickup image information of the object stored in a predetermined storing section; (b) a step of acquiring position information of the characteristic points of the predetermined face parts from the face pickup image information of the object acquired in the step (a) and acquiring color information of the predetermined pixels; (c) a step of generating a head portion shape model of the character on the basis of the characteristic points of the predetermined face parts acquired in the step (a); (d) a step of setting lookalike flesh color information for the flesh color of a head portion texture of the character similar to the flesh color of the original object on the basis of the color information of the predetermined pixels, and also of selecting lookalike anime-like parts corresponding to the face parts of the object on the basis of the characteristic points acquired in the step (a), and setting an arrangement of the selected lookalike anime-like parts to generate a face part texture corresponding to the face part; (e) a step of pasting the face part texture generated in the step (d) to the head portion shape model of the character and replacing color information of a skin portion of the head portion texture pasted to the head portion shape model generated in the step (c) with the lookalike flesh color information set in the step (d).

As noted in the second element of the present invention, there is provided a character generating method, wherein the step (d) of the character generating method described in the first element of the present invention includes: (d1) a step of, on the basis of the position information of the characteristic points acquired in the step (b), selecting the lookalike anime-like parts similar to the shape of the face part of the object from a plurality of anime-like parts prepared in advance to correspond to the face part; (d2) a step of, on the basis of the color information of the predetermined pixels acquired by the step (b), selecting the lookalike flesh color information similar to the flesh color of the object from a plurality of flesh color settings prepared in advance; and (d3) a step of, on the basis of the position information of the characteristic points acquired by the step (b), setting an arrangement of the lookalike anime-like parts corresponding to face parts selected in the step (d1)) and generating the face part texture on the basis of the arrangement of the set lookalike anime-like parts.

As noted in the third element of the present invention, there is provided a character generating method, wherein the step (d1) of the character generating method described in the second element of the present invention converts position information of the characteristic points of either of the left or right basic face parts, when the face parts are configured into two left and right basic parts, into position information in which the characteristic points are moved to positions axisymmetrically about a face center line, estimates a shape of the basic face parts from an average of the position data of the characteristic points of the left and right basic face parts, and selects the lookalike anime-like parts corresponding to the estimated shape of the basic face parts from the plurality of anime-like parts. When the face part is composed of one basic face part, the method estimates a shape of the face part from position information of the characteristic points of the face part and selects the lookalike anime-like part corresponding to the estimated shape of the face part from the plurality of anime-like parts.

As noted in the fourth element of the present invention, there is provided a character generating method, wherein the step (d3) of the character generating method described in the second or third elements of the present invention, for a face part texture corresponding to a face part for which a position pasted to the head portion shape model is set in advance, arranges the lookalike anime-like part of a nose and the lookalike anime-like part of a mouth at predetermined positions in the face part textures of the nose and the mouth, arranges the lookalike anime-like parts of left and right eyes axisymmetrically about the face center line at an interval between the left and right eyes calculated from the position information of the characteristic points at predetermined vertical positions in the face part texture of the eyes, arranges the lookalike anime-like parts of left and right eyebrows axisymmetrically about the face center line at predetermined crosswise positions of the eyebrows in the face part texture and vertical positions calculated from the position information of the characteristic points, and, on the basis of the arrangement of the lookalike anime-like parts corresponding to nose, mouth, eyes, and eyebrows, generates the face part textures corresponding to nose, mouth, eyes, and eyebrows.

As noted in the fifth element of the present invention, there is provided a character generating method, wherein the step (d3) of the character generating method described in the second or third element of the present invention, in the face part texture corresponding to a face part for which a position pasted to the head portion shape model is set in advance, calculates a position of the lookalike anime-like part in the face part texture corresponding to the face part on the basis of the position information of the characteristic points acquired in the step (b) and generates the face part texture on the basis of the calculated position of the lookalike anime-like part.

As noted in the sixth element of the present invention, there is provided a character generating method, wherein the step (d3) of the character generating method described in the fourth or fifth elements of the present invention selects a lookalike model face part texture in which the anime-like parts have an arrangement similar to the arrangement of the lookalike anime-like parts corresponding to the face parts from a plurality of model face part textures corresponding to the face parts and sets the selected lookalike model face part texture as the face part texture.

As noted in the seventh element of the present invention, there is provided a character generating method, wherein the step (c) of the character generating method described in any one of the first to sixth elements of the present invention selects, from a plurality of bone structure shape models prepared in advance to correspond to a facial bone structure, a basic head portion shape model similar to the facial bone structure on the basis of the characteristic points of the facial bone structure. It also selects, from a plurality of part shape models prepared in advance to correspond to predetermined face parts, exclusive of the facial bone structure, lookalike part shape models similar to the set face parts on the basis of the characteristic points of the set face parts, and generates the head portion shape model by combining the selected basic head portion shape model and the lookalike part shape models.

As noted in the eighth element of the present invention, there is provided a character generating method, wherein the step (c) of the character generating method described in any one of the first to sixth elements of the present invention selects, from a plurality of reference shape models prepared in advance to correspond to a facial bone structure, the head portion shape model similar to the facial bone structure on the basis of the characteristic points of the facial bone structure.

As noted in the ninth element of the present invention, there is provided a character generating method, wherein, in the character generating method described in one of the first to eighth elements of the present invention, the computer further performs the step (f) of, while displaying face arrangement guide information showing an arrangement of the predetermined face parts as well as the object on the display unit, picking up an image of the object on the basis of the face arrangement guide information and storing the pickup image information of the object in the predetermined storing unit before the step (a). The process in the step (a) acquires the face pickup image information of the object on the basis of the face arrangement guide information, from the pickup image information of the object stored in the predetermined storing unit.

As noted in the tenth element of the present invention, there is provided a character generating method, wherein, in the character generating method described in one of the first to ninth elements of the present invention, the computer further performs the step (g) of inputting the pickup image information of the object and storing the pickup image information in the predetermined storing unit before the step (a). The step (a), while displaying the face arrangement guide information showing an arrangement of the predetermined face parts and the pickup image information of the object input in the step (g) on the display unit, on the basis of the face arrangement guide information, acquires the face pickup image information of the object from the pickup image information of the object stored in the predetermined storing unit.

As noted in the eleventh element of the present invention, there is provided a character generating method, wherein, in the character generating method described in the ninth or tenth elements of the present invention, the predetermined face parts, the arrangement of which is represented by the face arrangement guide information, include at least a facial bone structure.

As noted in the first element of the present invention, there is provided a program that causes a computer to execute a process of generating a face as an anime-like portrait, based on face pickup image information of an object, for a character displayed as the presence in a virtual space on a display unit, wherein the computer is caused to execute processing to realize the units, described in the first to eleventh elements of the present invention, of the character generating system.

Advantageous Effects of Invention

Using the present invention, a face of a character in a virtual space realized by using a computer such as a portable video-game console can be easily generated as an anime-like portrait based on face pickup image information of an object photographed with a digital camera or similar tool. A face of a character appearing in a virtual space in a game or similar software is generated as an anime-like portrait based on face pickup image information of a user to cause the user to empathize more strongly with the character and to make it possible to construct more enjoyable game software. In addition, the amount of data needed for a character using an anime-like portrait is less than that needed for a character using a photographic image, which allows the construction of a game or similar software with increased processing speed, and many more characters able to appear.

BRIEF DESCRIPTION OF DRAWINGS

FIGS. 1A, 1B show an example of character 70 generated by a character generating system 10 which represents an embodiment of the present invention, in which FIG. 1A shows an example of a female character 70a and FIG. 1B shows an example of a male character 70b.

FIGS. 10A to 10C are diagrams showing a plurality of examples of anime-like parts for male eyebrows.

FIGS. 11A to 11C are diagrams showing a plurality of examples of anime-like parts for male eyes.

FIGS. 12A to 12C are diagrams showing a plurality of examples of anime-like parts for male mouths.

FIG. 14A is a plan view of the front of the face and FIG. 14B is a plan view of a lateral side of the face.

FIGS. 15A and 15B are diagrams to illustrate a head portion shape model 60, in which FIG. 15A is a plan view of the front of the face and FIG. 15B is a plan view of a lateral side of the face.

DESCRIPTION OF EMBODIMENTS

An embodiment according to the present invention will be described below with reference to the accompanying drawings. The embodiment described below is an example provided for an explanation, and does not limit the scope of the present invention. Thus, a person skilled in the art could employ an embodiment in which some elements of the present invention or all the elements thereof are replaced with elements equivalents to the above elements. However, the resultant embodiments are included in the scope of the invention.

Figure 1A:
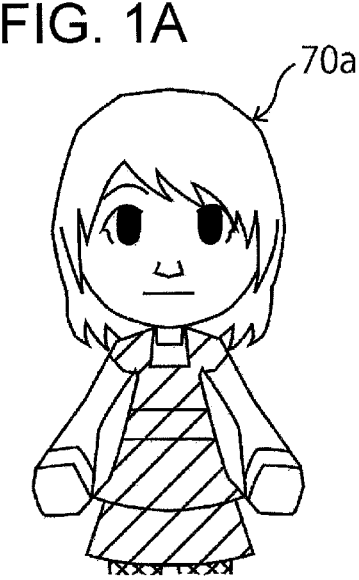
Figure 1B:
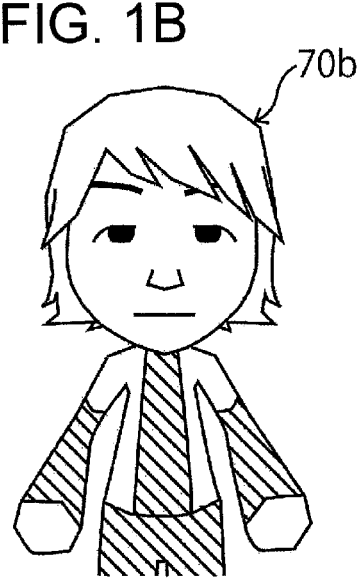

A character generating system 10 according to an embodiment of the present invention is a character generating system that generates, in a virtual space realized by a game or similar software operating on a computer, the face of a character, displayed on a display unit as a presence in the virtual space, as an anime-like portrait based on face pickup image information of an object (for example, the user herself/himself). FIGS. 1A, 1B show an example of a virtual character, Character 70, generated by the character generating system 10 according to an embodiment of the present invention and realized by game software operating on a portable video-game console. FIG. 1A is an example showing a female character, 70a, and FIG. 1B is an example showing a male character, 70b.

In this case, the face pickup image information of the object is pickup image information of the face portion, from pickup image information of a person picked up using a digital camera or similar tool. It may be pickup image information directly acquired from an image pickup unit connected to the computer or built into the computer, or it may be pickup image information input from an input unit connected to the computer and obtained from a previously picked up image. The pickup image information may also be image information with one piece of pickup image information partially corrected or a plurality of pickup images synthesized with each other to form one piece of face pickup image information. The anime-like portrait based on face pickup image information of an object resembles the face pickup image information of the object and, moreover, appears as a cartoon or an animation that emphasizes cuteness.

A schematic configuration of a computer that executes the character generating system 10 according to an embodiment of the present invention is described below. In the embodiment, the explanation will be made by using a portable video-game console 20 as the computer.

Figure 2:
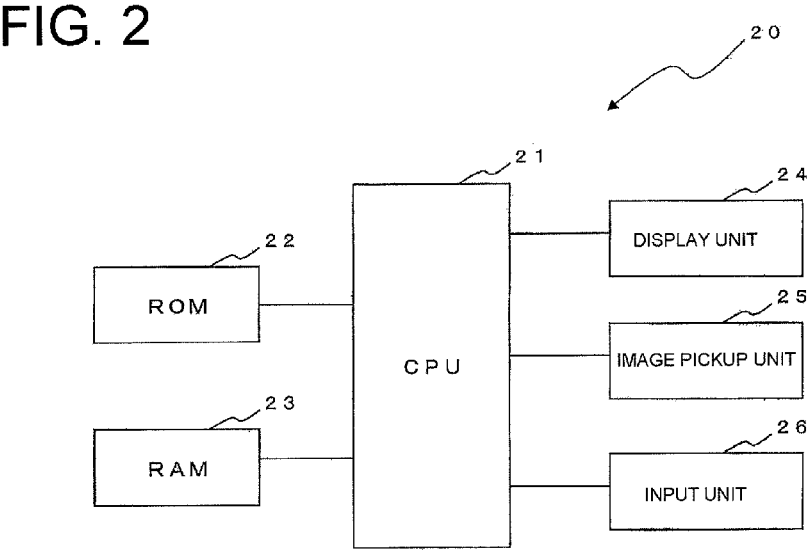
FIG. 2 is a diagram showing a schematic configuration of a portable video-game console 20 that is caused to execute a character generating system 10 according to an embodiment of the present invention.

FIG. 2 is a diagram showing a schematic configuration of a portable video-game console 20 that executes the character generating system 10 according to an embodiment of the present invention. As shown in FIG. 2, the portable video-game console 20 includes a CPU (Central Processing Unit) 21, a ROM 22, a RAM 23, a display unit 24, an image pickup unit 25, and an input unit 26.

The ROM 22 stores software and data to realize the character generating system 10. The CPU 21 reads necessary information from the ROM and processes it so as to realize the character generating system 10. The RAM 23 functions as a storing apparatus for data required to realize the character generating system 10 executed by the portable video-game console 20 and as an execution work area for the software.

Figure 3:
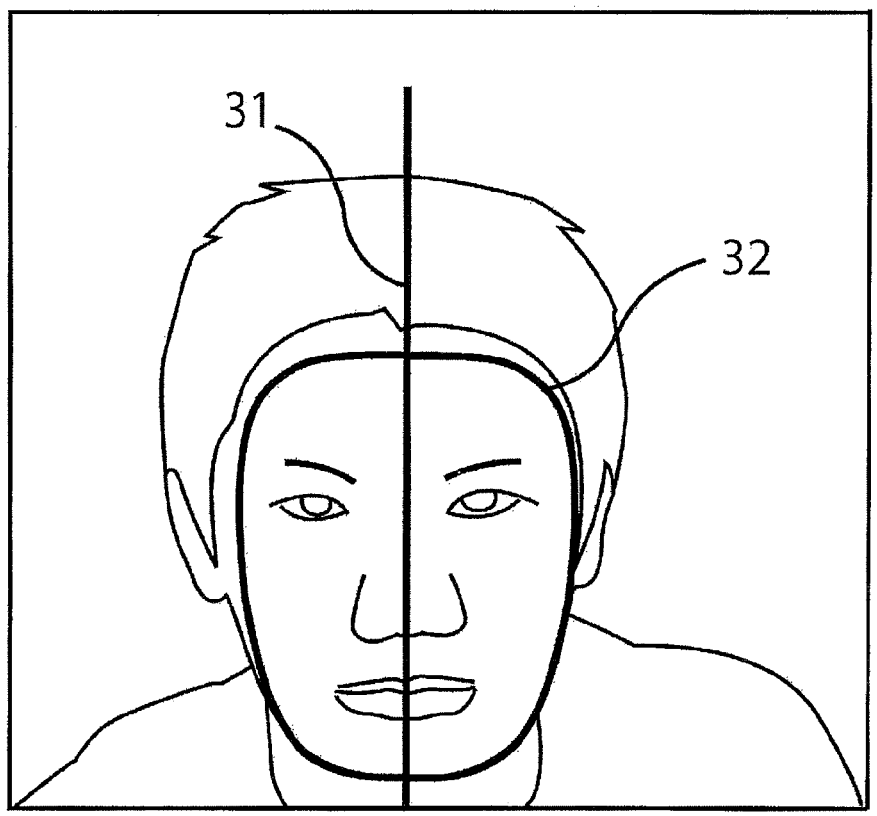
FIG. 3 is a diagram showing an example of a display screen on which face arrangement guide information is displayed.

The display unit 24 outputs display information (for example, information urging a user to perform an operation, face arrangement guide information, etc.) as instructed by the CPU 21. In this case, the face arrangement guide information is a display of an arrangement of predetermined face parts and information to set a position reference and a region from which to extract face pickup image information to create a face portion from pickup image information of the photographic subject. The predetermined face parts are part such as eyes, a nose, a mouth, a facial bone structure, or eyebrows e.g. parts that compose a face, and include at least a facial bone structure. FIG. 3 is an example of a display screen on which the face arrangement guide information is displayed. As shown in FIG. 3, the face arrangement guide information represents a nose position 31 and a facial bone structure 32. The facial bone structure 32 corresponds to a head portion shape model of the character 70.

The image pickup unit 25 picks up an image of a photographic subject in response to an instruction from the CPU 21, and stores the pickup image information of the photographed subject in the RAM 23. The input unit 26, which may be, for example, an operation button, a communication apparatus, an external memory device, etc., takes in input information (for example, information of an operation button operated by a user, pickup image information, etc.) as instructed by the CPU 21, and stores the input information in the RAM 23.

Figure 4:
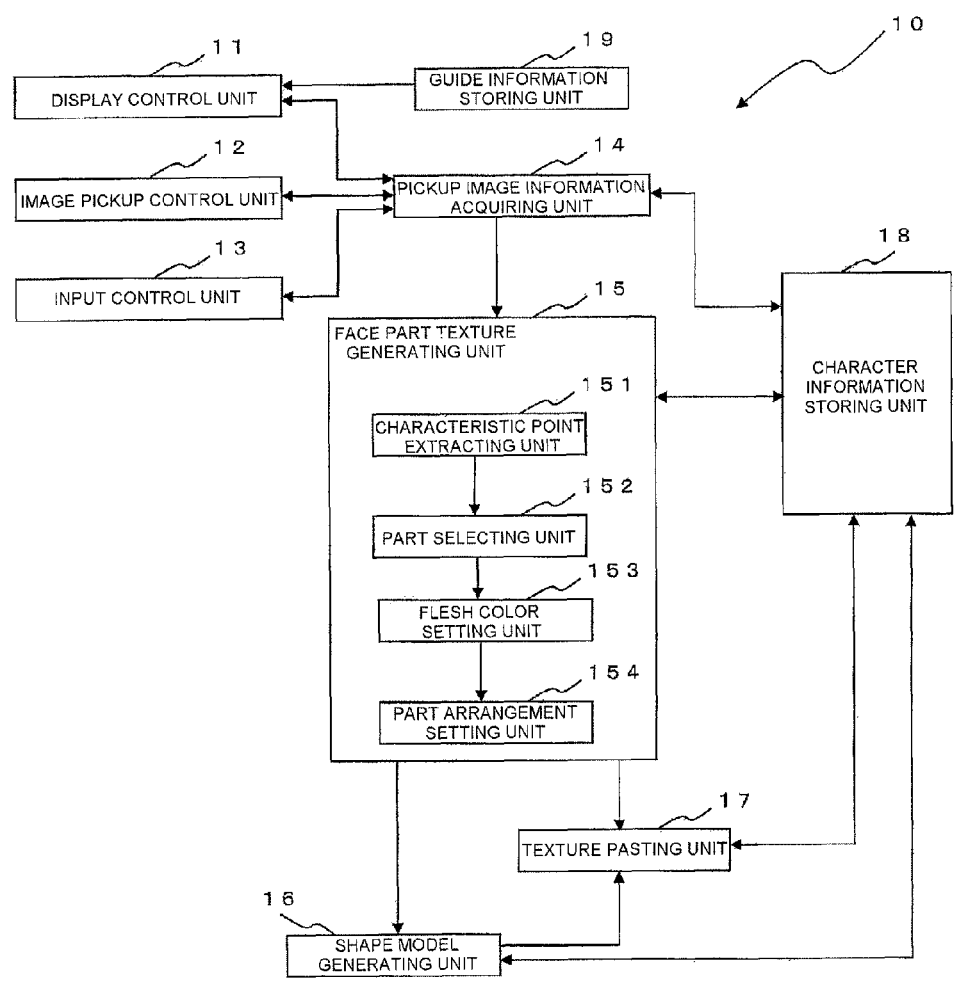
FIG. 4 is a diagram showing an example of a system configuration of the character generating system 10 according to an embodiment of the present invention.

A system configuration in the character generating system 10 according to an embodiment of the present invention will be described below. FIG. 4 is a diagram showing an example of a system configuration in the character generating system 10 according to an embodiment of the present invention.

As shown in FIG. 4, the character generating system 10 includes a display control unit 11, an image pickup control unit 12, an input control unit 13, a pickup image information acquiring unit 14, a face part texture generating unit 15, a shape model generating unit 16, a texture pasting unit 17, a character information storing unit 18, and a guide information storing unit 19. The face part texture generating unit 15 includes a characteristic point extracting unit 151, a part selecting unit 152, a flesh color setting unit 153, and a part arrangement setting unit 154.

The display control unit 11 controls the display unit 24, causing it to take necessary information, such as face arrangement guide information representing an arrangement of predetermined face parts and information prompting a user to perform an operation, from the guide information storing unit 19 to generate and show display information from the taken information. The display control unit 11 controls not only the above but also all processes of the display unit 24. The image pickup control unit 12 controls the image pickup unit 25, causing it to pick up an image of a photographic subject and store pickup image information of that object in the character information storing unit 18. The input control unit 13 controls the corresponding input unit 26, causing it to take in various pieces of input information (for example, pickup image information obtained from a prior image pickup, etc.) and store necessary information in the character information storing unit 18. Although the pickup image information of the photographic subject is stored in the character information storing unit 18 here, it may also be stored in a temporary storing unit.

The pickup image information acquiring unit 14 connects the display control unit 11 and the image pickup control unit 12 in order to display face arrangement guide information showing an arrangement of predetermined face parts as well as an object (the photographic subject) on the display unit 24, and picks up an image of the face of the object to match with the arrangement of face parts in the face arrangement guide information (see FIG. 3). In particular, the image of the face of the object is picked up such that the width of the facial bone structure 32 and the jaw shape (lower bone structure) match the width of the face and jaw shape of the object.

The pickup image information acquiring unit 14 acquires face pickup image information from the pickup image information of the photographed object in order to generate an anime-like portrait based on the face pickup image information. The face pickup image information is acquired from the pickup image information of the object, the image of which is picked up by the image pickup unit 25. However, the face pickup image information may be acquired from pickup image information of object input from the input unit 26. Specifically, the pickup image information acquiring unit 14 connects the display control unit 11 and the input control unit 13. While face arrangement guide information showing the arrangement of predetermined face parts along with the pickup image information of the photographic subject is displayed on the display unit 24, and while relatively matching the arrangement of face parts in the face arrangement guide information with the arrangement of face parts in the pickup image information of the photographic subject, the pickup image information acquiring unit 14 acquires face pickup image information matched with the face arrangement guide information.

Figure 5:
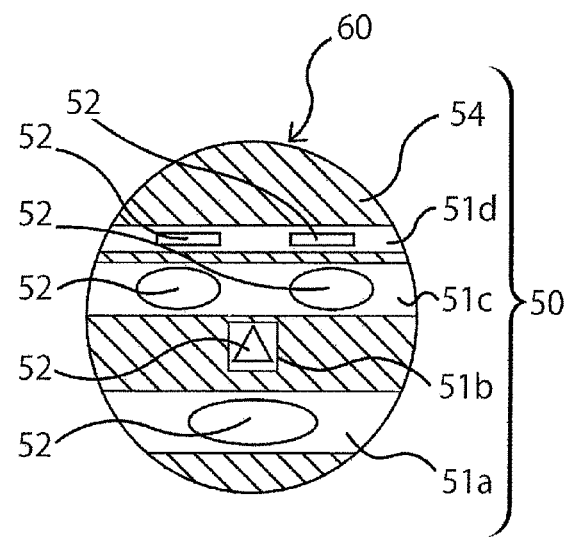
FIG. 5 is a plan view showing a head portion shape model 60 illustrating a face part texture when viewed from a front side of the head portion shape model 60.

The face part texture generating unit 15 has the function of generating face part textures corresponding to face parts such as nose, mouth, eyes, and eyebrows to be pasted to the head portion shape model 60 (see FIGS. 15A and 15B), which will become an anime-like portrait of the character 70 based on the face pickup image information of the object. Unit 15 includes a characteristic point extracting unit 151, a part selecting unit 152, a flesh color setting unit 153, and a part arrangement setting unit 154. FIG. 5 is a plan view showing the head portion shape model 60 to illustrate a face part texture as viewed from the front.

As shown in FIG. 5, the positions of face part textures 51 (for example, mouth face part texture 51a, nose face part texture 51b, eyes face part texture 51c, and eyebrows face part texture 51d) to be pasted on the head portion shape model 60 are set in advance. The face part textures 51 are textures on which lookalike anime-like parts 52 similar to the face parts of the object are arranged. For example, as shown in FIG. 5, the eyes face part texture 51c is a texture on which two lookalike anime-like parts 52, selected on the basis of the basic face parts of the right and left eyes, are arranged. In FIG. 5, although the face part textures 51 are arranged not to overlap, as long as the different lookalike anime-like parts 52 do not overlap, the face part textures 51 may be arranged to overlap.

In the present specification, when there are two left and right parts such as eyes, the right and left eyes are called basic face parts, and the left and right eyes together are called a face part. When there is one part such as a mouth, the mouth is called a basic face part and/or a face part. A texture pasted to the head portion shape model 60 is called a head portion texture 50, and the rest of head portion texture 50, exclusive of the face part textures 51, is called a blank space 54. In other words, the head portion texture 50 pasted to the head portion shape model 60 is composed of the face part textures 51 and the blank space 54.

Figure 6A:
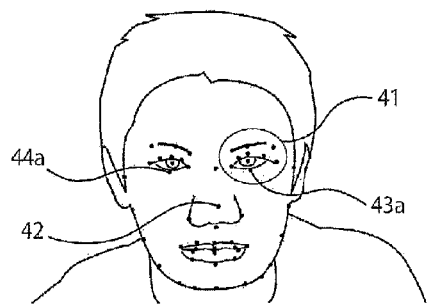
FIG. 6A is a diagram illustrating characteristic points.
Figure 6B:
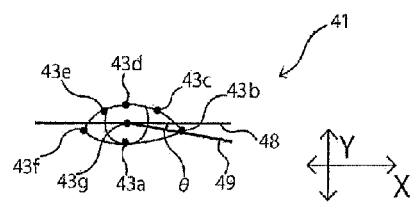
FIG. 6B is an enlarged diagram of a right-eye area 41.

The characteristic point extracting unit 151 of the face part texture generating unit 15 extracts the characteristic points of predetermined face parts and the color information of predetermined pixels from the face pickup image information acquired by the pickup image information acquiring unit 14. In other words, the position information of the characteristic points of predetermined face parts and the color information of predetermined pixels are both acquired from the face pickup image information, which is acquired by the pickup image information acquiring unit 14. FIG. 6A is a diagram illustrating characteristic points, and FIG. 6B is an enlarged diagram of a right-eye area 41. In FIGS. 6A and 6B, eyebrows, eyes, nose, mouth, and bone structure of the face are set as predetermined face parts. A solid black dot indicates a characteristic point. Characteristic points are points that characterize the shape of the predetermined face part. For example, the seven black dots in the right-eye area 41 are characteristic points 43a to 43g of the right eye. The color information of the predetermined pixels includes, for example, color information of a pixel at the nose tip 42 and color information of pixels at lower positions 43a and 44a below both eyes. The right and left of the right and left eyes, eyebrows, etc., are the observer's right and left. The color information is expressed by RGB, YUV, etc.

Figure 7A:
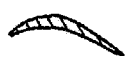
FIGS. 7A to 7C are diagrams showing a plurality of examples of anime-like parts for female eyebrows.
Figure 7B:
Figure 7C:
Figure 8A:
FIGS. 8A to 8C are diagrams showing a plurality of examples of anime-like parts for female eyes.
Figure 8B:
Figure 8C:
Figure 9A:
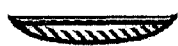
FIGS. 9A to 9C are diagrams showing a plurality of examples of anime-like parts for female mouths.
Figure 9B:
Figure 9C:
Figure 10A:
Figure 10C:
Figure 10C:

The part selecting unit 152 of the face part texture generating unit 15 estimates a shape of the face part on the basis of the position information of the characteristic points of predetermined face parts extracted by the characteristic point extracting unit 151, and selects the lookalike anime-like parts 52 similar to the estimated shapes of the face parts from a plurality of anime-like parts prepared in advance. In this case, the anime-like parts are drawings obtained by deforming corresponding face parts. A plurality of anime-like parts are prepared based on sex, race, age, and other factors. FIGS. 7A to 12C are diagrams showing examples of anime-like parts corresponding to face parts. FIGS. 7A to 7C are diagrams showing a plurality of examples of anime-like parts for female eyebrows. FIGS. 8A to 8C are diagrams showing a plurality of examples of anime-like parts for female eyes. FIGS. 9A to 9C are diagrams showing a plurality of examples of anime-like parts for female mouths. FIGS. 10A to 10C are diagrams showing a plurality of examples of anime-like parts for male eyebrows. FIGS. 11A to 11C are diagrams showing a plurality of examples of anime-like parts for male eyes. FIGS. 12A to 12C are diagrams showing a plurality of examples of anime-like parts for male mouths.

As shown in FIGS. 6A and 6B, with respect to eyes for example, shapes of the eyes are estimated by an eye width (interval between the point 43b and the point 43f), an eye height (interval between the point 43a and the point 43d), and an eye inclination to identify droopy eyes, up-angled eyes, and other shapes (angle θ between a line segment 49 connecting the point 43g and the point 43b and a line segment 48 horizontally (crosswise) extending from point 43g in a lateral direction (X direction)). Therefore, of a plurality of anime-like parts for eyes, the anime-like part closest to the estimated eye width, estimated eye height, and estimated eye inclination serves as the lookalike anime-like part 52 for the eye.

Since eyebrows and eyes are composed of two left and right basic face parts, the left and right parts may have different shapes when estimated independently. However, when the balance of the entire face is considered, to preserve the balance of a face having a horizontally (crosswise) symmetrical shape (axisymmetrical shape about a face center line), position information of, for example, the left eye is converted into position information in which the left eye is axisymmetrically moved about the face center line, i.e., the position of the left eye is crosswise inverted to convert the position of the left eye into the position of a right eye. On the basis of an average of position information of the characteristic points of the resulting two right eyes, position information of the characteristic points of the eyes is calculated, and the shapes of the eyes are estimated. The same is also applied to the eyebrows. With respect to the nose, mouth, and bone structure of the face, the shapes are estimated from position information of extracted characteristic points. With respect to the eyes, color information of pupils is extracted with the characteristic point extracting unit 151, and, on the basis of the estimated color information the color information of the pupils of the lookalike anime-like parts 52 may be changed.

The flesh color setting unit 153 of the face part texture generating unit 15, on the basis of color information of predetermined pixels extracted by the characteristic point extracting unit 151, calculates color information (to be referred to as lookalike flesh color information hereinafter) similar to the flesh color of an object, and sets the calculated lookalike flesh color information as color information for the head portion texture 50 of the character 70. For example, when the color information of the predetermined pixels extracted by the characteristic point extracting unit 151 includes color information of a pixel on the nose tip 42 and color information from pixels in positions 43a and 44a below both the eyes, an average of the color data of the three pixels is calculated, the calculated color data are defined as lookalike flesh color information.

The part arrangement setting unit 154 of the face part texture generating unit 15 sets an arrangement of the lookalike anime-like parts 52 selected by the part selecting unit 152 in the face part textures 51, on the basis of the position information of the characteristic points of predetermined face parts extracted by the characteristic point extracting unit 151. It generates the face part textures 51 on the basis of the set positions of the lookalike anime-like parts 52.

Figure 13:
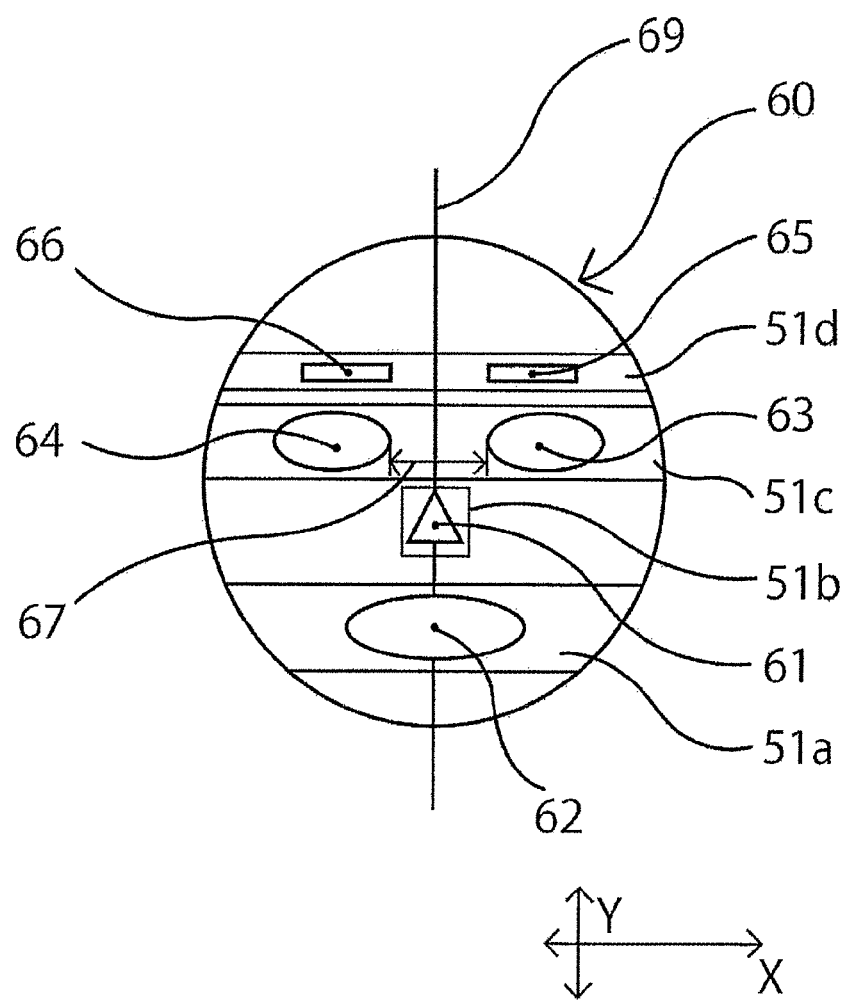
FIG. 13 is a plan view showing the head portion shape model 60 to illustrate an arrangement of lookalike anime-like parts in face part textures 51 as viewed from the front.

FIG. 13 is a plan view showing the head portion shape model 60 to illustrate an arrangement of the lookalike anime-like parts 52 in the face part textures 51 when viewed from the front side of the head portion shape model 60. As shown in FIG. 13, on the face part textures 51a, 51b, 51c, and 51d pasted to the head portion shape model 60, a point 61 indicates an arrangement of the nose lookalike anime-like part 52, a point 62 indicates an arrangement of the mouth lookalike anime-like part 52, a point 63 indicates an arrangement of the right-eye lookalike anime-like part 52, a point 64 indicates an arrangement of the left-eye lookalike anime-like part 52, a point 65 indicates an arrangement of the right-eyebrow lookalike anime-like part 52, and a point 66 indicates an arrangement of the left-eyebrow lookalike anime-like part 52.

Positions to which face part textures 51a, 51b, 51c, and 51d are pasted are set in advance on head portion shape model 60.

With respect to the nose face part texture 51b and the mouth face part texture 51a, point 61, indicating the position of the nose lookalike anime-like part 52, and point 62, indicating the position of the mouth lookalike anime-like part 52, are set in advance. With respect to the arrangement of the eye lookalike anime-like parts 52 for the eye face part texture 51c, a position of the eye lookalike anime-like parts 52 in a vertical direction (height direction: Y direction) is set in advance, and positions in a crosswise direction (width direction: X direction) are calculated from both the eyes. More specifically, at the vertical (height direction: Y direction) positions of the preset lookalike anime-like parts 52 of both the eyes, an interval 67 between the lookalike anime-like parts 52 of both the eyes is calculated from the characteristic points of both the eyes. The lookalike anime-like parts 52 of both the eyes are arranged axisymmetrically about a face center line 69. With respect to arrangements of the eyebrow lookalike anime-like parts 52 for the eyebrow face part textures 51d, crosswise positions of the eyebrow lookalike anime-like parts 52 are set in advance, and vertical positions are calculated from the characteristic points of both the eyebrows. The vertical positions of the lookalike anime-like parts 52 of both the eyebrows are calculated from the characteristic points of both the eyebrows, and the lookalike anime-like parts 52 of both the eyebrows are arranged axisymmetrically about the face center line 69.

An arrangement of the lookalike anime-like parts 52 for the face part textures 51 is not limited to the arrangement processing described above. On the basis of the characteristic points of the face parts, arrangements of lookalike anime-like parts 52 in all the face part textures 51 may be calculated. The arrangements of the lookalike anime-like parts 52 for the face part textures 51 may be fixed in advance.

Not only the face part textures 51 in which the lookalike anime-like parts 52 are arranged on the basis of the arrangement of the lookalike anime-like parts 52 for the face part textures 51, but also lookalike model face part textures, with similar arrangements of lookalike anime-like parts 52 that correspond to the face part textures 51, are selected from a plurality of model face part textures corresponding to face parts, and the selected lookalike model face part textures may be set as the face part textures 51.

As described above, the face part texture generating unit 15 generates the face part textures 51 corresponding to the face parts of an anime-like portrait based on face pickup image information of a photographic subject. The generated face part textures 51 are stored in the character information storing unit 18.

A shape model generating unit 16 has the function of generating the head portion shape model 60 on the basis of the characteristic points of predetermined face parts. It pastes the blank space 54 of the head portion texture 50 to the generated head portion shape model 60.

A part shape model 71 (to be referred to as a basic head portion shape model hereinafter) of a head portion bone structure similar to the facial bone structure is selected from a plurality of bone structure shape models stored in advance in the character information storing unit 18, on the basis of the characteristic points of a facial bone structure acquired by the face part texture generating unit 15. From a plurality of part shape models corresponding to predetermined face parts stored in advance in the character information storing unit 18, a part shape model 72 (to be referred to as a lookalike part shape model hereinafter) similar to the face part is selected. The selected basic head portion shape model 71 and the selected lookalike part shape model 72 are combined (united) with each other to generate the head portion shape model 60. In this case, the basic head portion shape model 71 is a head portion shape model without a part shape model portion corresponding to a particular face part. More specifically, when the particular face part is a nose, for example, the head portion shape model without a nose is the basic head portion shape model 71.

Figure 14A:
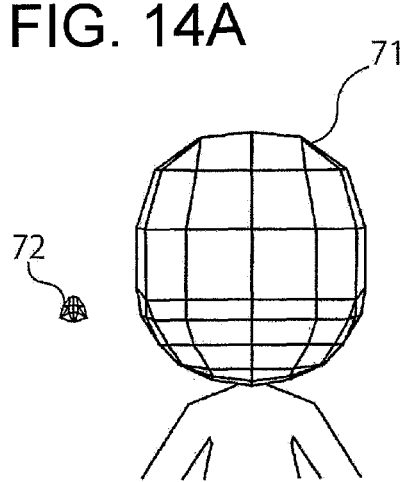
FIGS. 14A and 14B are diagrams to illustrate a basic head portion shape model 71 and a lookalike part shape model 72 before a nose is arranged.
Figure 14B:
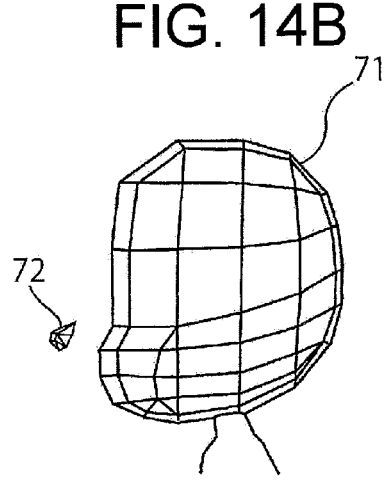
Figure 15A:
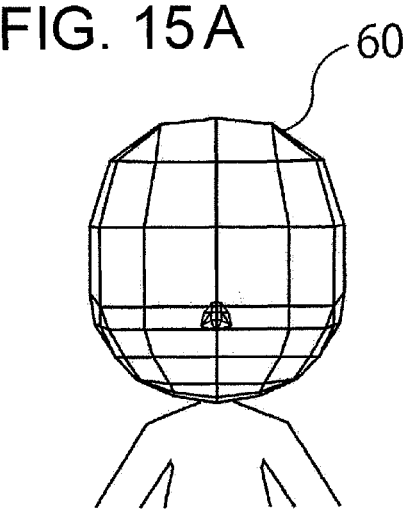
Figure 15B:
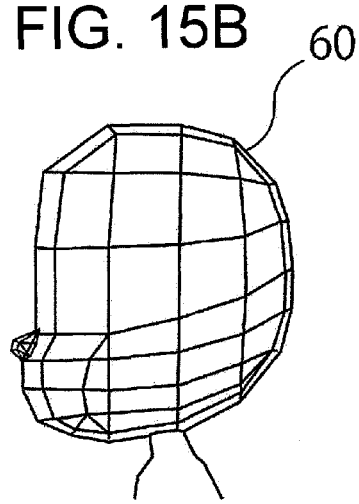

FIGS. 14A, 14B are diagrams illustrating the basic head portion shape model 71 and the lookalike part shape model 72 before a nose is arranged. FIG. 14A is a plan view of a front side of a face, FIG. 14B is a plan view of a lateral side of the face. FIGS. 15A and 15B are diagrams illustrating the head portion shape model 60. FIG. 15A is a plan view of the front side of a face, and FIG. 15B is a plan view of a lateral side of the face. In FIGS. 14A and 14B and FIGS. 15A and 15B, as the lookalike part shape model 72, the nose lookalike part shape model 72 is used as an example. The basic head portion shape model 71, selected on the basis of the characteristic points of the facial bone structure, and the nose lookalike part shape model 72, selected on the basis of the characteristic points of the nose, both shown in FIGS. 14A and 14B, are combined with each other to generate the head portion shape model 60 shown in FIGS. 15A and 15B.

Generation of the head portion shape model 60 by combining the basic head portion shape model 71 and the lookalike part shape model 72 has been used as an example of generating the head portion shape model 60. However, the head portion shape model 60 similar to the facial bone structure may also be selected from the plurality of reference shape models stored in the character information storing unit 18 in advance, on the basis of the characteristic points of the facial bone structure acquired by the face part texture generating unit 15. Moreover, a preset head portion shape model 60 may also be stored in and extracted from the character information storing unit 18.

A texture pasting unit 17 pastes the face part textures 51 generated by the face part texture generating unit 15 to the head portion shape model 60 generated by the shape model generating unit 16, and replaces color information of the blank space 54 of the head portion texture 50 and color information of skin portions of the face part textures 51 with lookalike flesh color information set by the flesh color setting unit 153 of the face part texture generating unit 15.

A plurality of parts corresponding to hair styles, clothes, accessories, etc., that depend on game situation, sex, and other factors, are stored in advance in the character information storing unit 18. A user can be prompted to select desired parts, and predetermined parts can also be set. The processes of replacing the color information of the blank space 54 of the head portion texture 50 and the color information of the skin portions of the face part textures 51 with the lookalike flesh color information are performed by the texture pasting unit 17. However, the process of replacing the color information of the blank space 54 of the head portion texture 50 with the lookalike flesh color information may also be performed by the shape model generating unit 16, and the process of replacing the color information of the skin portions of the face part textures 51 with the lookalike flesh color information may also be performed by the part arrangement setting unit 154 of the face part texture generating unit 15.

The activation timing of the character generating system 10 according to an embodiment of the present invention will be described below. The case of a role-playing game (RPG) is used as an example of the activation timing of the character generating system 10 according to an embodiment of the present invention. In this role-playing game, not only are faces of all characters appearing in a virtual space of the RPG generated before the RPG is started by activating the character generating system 10 before the RPG is started, but also, in the middle of game progress of the RPG, the character generating system 10 is operated when a new character appears in the virtual space to make it possible to generate the face of the appearing character 70. In other words, the character generating system 10 can be activated at an activation time desired by the user.

In the character generating system 10 according to an embodiment of the present invention described above, a face of the character 70 in the virtual space realized by using the portable video-game console 20 can be easily generated as an anime-like portrait based on face pickup image information of an object photographed with a digital camera or similar tool. When the face of the character 70 appearing in the virtual space of the game or similar software is generated as an anime-like portrait based on face pickup image information of a user, the user can empathize more strongly with the character 70, which makes it possible to construct more enjoyable game software. In addition, the amount of data needed for a character using an anime-like portrait is less than that needed for a character using a photographic image, which allows the construction of a game or similar software with increased processing speed, and many more characters 70 able to appear.

A character generating method according to an embodiment of the present invention will be described below.

Figure 16:
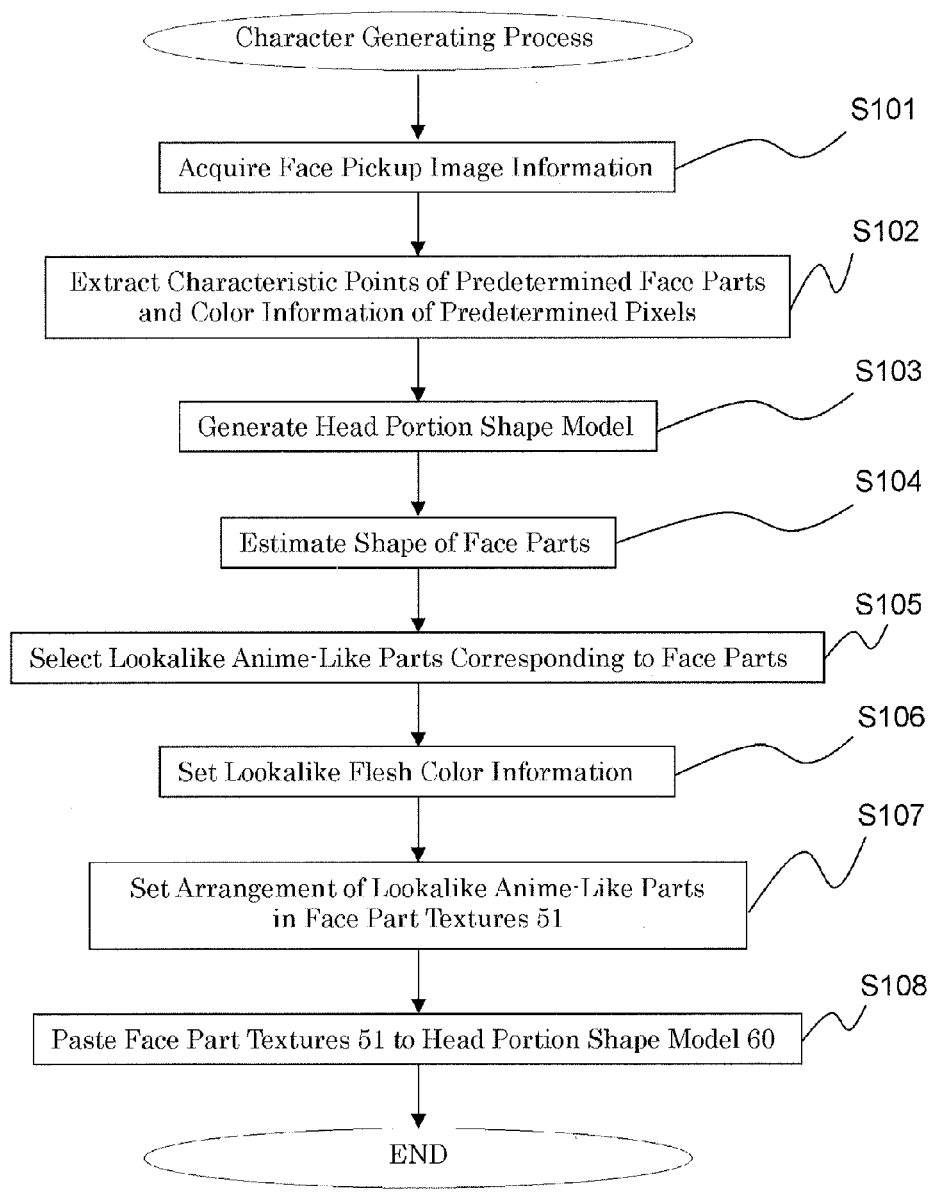
FIG. 16 is an example of a flow chart showing the procedures of a program that causes a computer to execute the steps of a character generating method according to an embodiment of the present invention.

FIG. 16 is an example of a flow chart showing each process of a program that causes a computer to execute the steps of the character generating method according to an embodiment of the present invention.

To generate a character, face pickup image information from which to generate an anime-like portrait is acquired (step 101: S101). In this case, while face arrangement guide information showing an arrangement of predetermined face parts as well as a photographic subject are displayed on the display unit 24, an image of a face of the photographic subject is picked by the image pickup unit 25 to match with the arrangement of face parts in the face arrangement guide information, and pickup image information of the photographic subject is acquired. Then face pickup image information is acquired from the pickup image information of the photographic subject. In this case, although the image of the photographic subject is picked up by the image pickup unit 25 and the pickup image information is thus acquired and used, pickup image information input from the input unit 26 may be used. Image information may be obtained such that one piece of face pickup image information is formed by partially correcting one piece of pickup image information or by synthesizing a plurality of pickup images.

From the face pickup image information, the characteristic points of predetermined face parts and the color information of predetermined pixels are extracted (step 102: S102). More specifically, from the face pickup image information acquired by the process in step 101, position information for the characteristic points of the predetermined face parts are acquired, and the color information of the predetermined pixels is acquired. In this case, for example, the predetermined face parts include eyebrows, eyes, a nose, a mouth, and a bone structure of a face. The color information of the predetermined pixels includes, for example, color information of a pixel on the nose tip 42 in FIGS. 6A and 6B and color information of pixels in positions 43a and 44a below both the eyes.

The head portion shape model 60 is generated on the basis of the position information of the characteristic points of the predetermined face parts extracted by the process in step 102 (step 103: S103). As explained about the shape model generating unit 16 above, for example, the basic head portion shape model 71 similar to the facial bone structure is selected from the plurality of bone structure shape models stored in advance in the character information storing unit 18, on the basis of the characteristic points of the facial bone structure acquired by the face part texture generating unit 15. The lookalike part shape model 72 similar to the face part is selected from the plurality of part shape models corresponding to the predetermined face parts stored in advance in the head portion shape model 60. The selected basic head portion shape model 71 and the lookalike part shape model 72 are combined with each other to generate the head portion shape model 60.

The head portion shape model 60 similar to the facial bone structure may also be selected from the plurality of reference shape models stored in advance in the character information storing unit 18, on the basis of the characteristic points of the facial bone structure acquired by the face part texture generating unit 15. Further, one preset head portion shape models 60 may be stored in and extracted from the character information storing unit 18.

On the basis of the position information of the characteristic points of the predetermined face parts extracted by the process in step 102, a shape of the face part is estimated (step, 104: S104). As explained above using FIGS. 6A and 6B, with respect to eyes, for example, shapes of the eyes are estimated by an eye width (interval between the point 43b and the point 43f), an eye height (interval between the point 43a and the point 43d), and an eye inclination (angle θ between a line segment connecting the point 43g and the point 43b and a line segment horizontally (crosswise) extending from the point 43g in a lateral direction) representing droopy eyes, up-angled eyes, and other eye shapes.

The lookalike anime-like parts 52 similar to the shapes of the face parts estimated by the process in step 104 are selected from a plurality of lookalike anime-like parts prepared in advance (step 105: S105). Lookalike flesh color information similar to the flesh color of the object is calculated on the basis of the color information of the predetermined pixels extracted by the process in step 102 (step 106: S106). As described above using FIGS. 6A and 6B, when the extracted color information of the predetermined pixels includes, for example, color information from a pixel on the nose tip 42 and color information from pixels in positions 43a and 44a below both the eyes, the color data of the three pixels are averaged and the calculated color data defined as lookalike flesh color information.

An arrangement of the lookalike anime-like parts 52 in the face part textures 51 is set on the basis of the position information of the characteristic points of the predetermined face parts extracted by the process in step 102, and the face part textures 51 are generated on the basis of the set positions of the lookalike anime-like parts 52 (step 107: S107). As described above using FIG. 13, with respect to the nose face part texture 51b and the mouth face part texture 51a, the point 61, indicating the arrangement of the nose lookalike anime-like part 52, and the point 62, indicating the arrangement of the mouth lookalike anime-like part 52, are set in advance. With respect to an arrangement of the eye lookalike anime-like parts 52 for the eye face part texture 51c, a vertical position of the eye lookalike anime-like parts 52 is set in advance, and lateral positions are calculated from the characteristic points of both the eyes. The interval 67 between the lookalike anime-like parts 52 of both the eyes is calculated from the characteristic points of both the eyes, and the lookalike anime-like parts 52 of both the eyes are arranged axisymmetrically about the face center line 69. With respect to the arrangement of the eyebrow lookalike anime-like parts 52 for the eyebrow face part texture 51d, lateral positions of the eyebrow lookalike anime-like parts 52 are set in advance, and a vertical position is calculated from the characteristic points of both the eyebrows. The vertical positions of the lookalike anime-like parts 52 of both the eyebrows are calculated from the characteristic points of both the eyebrows, and the lookalike anime-like parts 52 of both the eyebrows are arranged axisymmetrically about the face center line 69. The arranging process described above need not always be used, and arrangements of the lookalike anime-like parts 52 in all the face part textures 51 may be calculated on the basis of the characteristic points of the face parts. The arrangement of the lookalike anime-like parts 52 for the face part textures 51 may be fixed in advance.

On the basis of the arrangement of the lookalike anime-like parts 52 for the face part textures 51, not only the face part textures 51 including the lookalike anime-like parts 52 arranged in the face part texture 51, but also lookalike model face part textures are selected from a plurality of model face part textures corresponding to face parts. The lookalike model face part textures are provided with similar arrangements of lookalike anime-like parts 52 that correspond to the face part textures 51. The selected lookalike model face part textures may be set as the face part textures 51.

Finally, the face part textures 51 generated by the process in step 107 are pasted to the head portion shape model 60 generated by the process in step 103, and the color information of the blank space 54 of the head portion texture 50 and the color information of the skin portions of the face part textures 51 are replaced with the lookalike flesh color information set by the process in step 106 (step 108: S108). In this manner, the character 70 with an attached anime-like portrait is generated. While the processes of replacing the color information of the blank space 54 of the head portion texture 50 and the color information of the skin portion of the face part texture 51 with lookalike flesh color information are performed by the process in step 108, the process of replacing the color information of the blank space 54 of the head portion texture 50 with the lookalike flesh color information may also be performed by the process in step 103, and the process of replacing the color information of the skin portion of the face part texture 51 with the lookalike flesh color information may also be performed by the process in step 107.

In the character generating method according to an embodiment of the present invention described above, the face of a character 70 in the virtual space realized by using the portable video-game console 20 can be easily generated as an anime-like portrait based on face pickup image information of an object photographed with a digital camera or similar tool. When the face of the character 70 appearing in the virtual space of the game or similar software is generated as an anime-like portrait based on face pickup image information of a user, the user can empathize more strongly with the character 70, which makes it possible to construct enjoyable game software. In addition, the amount of data needed for a character using an anime-like portrait is less than that needed for a character using a photographic image, which allows the construction of a game or similar software with increased processing speed and many more characters 70 able to appear.

The character generating system 10 according to an embodiment of the present invention described above is a system that uses a portable video-game console 20. However, the character generating system 10 is not limited to the above system. The character generating system 10 can also applied to the generation of a two-dimensional or three-dimensional character expressed as a presence in a virtual space realized by using a business-use video game apparatus (arcade video game machine), a home-use video game machine, a mobile phone, a stand-alone computer, a workstation computer system, a network computer system, or similar device.

The invention claimed is:

1. A character generating system that, by using a computer, generates a face of a character displayed on a display unit as a presence in a virtual space as an anime-like portrait based on face pickup image information of an object, wherein
   the computer includes:
   a pickup image acquiring unit that acquires the face pickup image information of the object from pickup image information of the object stored in a predetermined storing unit;
   a face part texture generating unit that extracts characteristic points from predetermined face parts and color information from predetermined pixels of the face pickup image information of the object acquired by the pickup image acquiring unit above, sets lookalike flesh color information for a head portion texture of the character similar to a flesh color of the photographed object on the basis of the extracted color information of the predetermined pixels, and also selects lookalike anime-like parts similar to the corresponding face parts of the object on the basis of the extracted characteristic points to generate a face part texture corresponding to the face part by setting an arrangement of the selected lookalike anime-like parts;
   a shape model generating unit that generates a head portion shape model on the basis of the characteristic points of the predetermined face parts; and
   a texture pasting unit that performs the step to replace color information of the head portion texture, exclusive of the face part texture to be pasted to the head portion shape model of the character, with the lookalike flesh color information set by the face part texture generating unit, as well as the step to paste the face part textures generated by the face part texture generating unit to the head portion shape model of the character.

2. The character generating system in claim 1, wherein the face part texture generating unit includes:
   a characteristic point extracting unit that acquires position information of the characteristic points of predetermined face parts from the face pickup image information of the object acquired by the pickup image acquiring unit and acquires the color information of predetermined pixels;

a part selecting unit that selects, on the basis of position information of the characteristic points acquired by the characteristic point extracting unit, lookalike anime-like parts similar in shape to face parts of the object from a plurality of anime-like parts prepared in advance to correspond to face parts;

a flesh color setting unit that selects, on the basis of the color information of predetermined pixels acquired by the characteristic point extracting unit, lookalike flesh color similar to the flesh color of the object from a plurality of flesh color settings prepared in advance; and a part arrangement setting unit that sets an arrangement of the lookalike anime-like parts corresponding to face parts selected by the part selecting unit on the basis of the position information of characteristic points acquired by the characteristic point extracting unit and generates the face part texture on the basis of the set arrangement of lookalike anime-like parts.

3. The character generating system of claim 2, wherein the part selecting unit, when the face part is composed of two left and right basic face parts, converts position information of the characteristic points of either of the left or right basic face parts into position information in which the characteristic points are moved to positions axisymmetrically about a face center line, estimates a shape of the basic face parts from an average value of the position information of the characteristic points of the two left and right basic face parts, and selects the lookalike anime-like part corresponding to an estimated shape of the basic face parts from the plurality of anime-like parts, and when the face part is composed of one basic face part, estimates a shape of the face part from position information of the characteristic points of the face part and selects the lookalike anime-like part corresponding to the estimated shape of the face part from the plurality of anime-like parts.

4. The character generating system of claim 2, wherein the part arrangement setting unit, for face part textures corresponding to the face parts for which positions pasted to the head portion shape model are set in advance, arranges the lookalike anime-like part of a nose and the lookalike anime-like part of a mouth at preset positions in the face part textures of the nose and the mouth, arranges the lookalike anime-like parts of the left and right eyes axisymmetrically about the face center line at an interval between the left and right eyes calculated from the position information of the characteristic points at preset vertical positions in the face part textures of eyes, arranges the lookalike anime-like parts of the left and right eyebrows axisymmetrically about the face center line at preset crosswise positions in the face part textures of the eyebrows and vertical positions calculated from the position information of the characteristic points, and on the basis of the arrangements of the lookalike anime-like parts corresponding to the nose, the mouth, the eyes, and the eyebrows, generates the face part textures corresponding to the nose, the mouth, the eyes, and the eyebrows.

5. The character generating system of claim 2, wherein the part arrangement setting unit, for face part textures corresponding to face parts for which positions pasted to the head portion shape model are set in advance, calculates positions of the lookalike anime-like parts in the face part texture corresponding to face parts on the basis of the position information of the characteristic points of the face parts acquired by the characteristic point extracting unit, and generates the face part textures on the basis of the calculated positions of the lookalike anime-like parts.

6. The character generating system of claim 4, wherein the part arrangement setting unit selects a lookalike model face part texture with a similar arrangement of lookalike anime-like parts that correspond to face parts from a plurality of model face part textures corresponding to face parts and sets the selected lookalike model face part texture as the face part texture.

7. The character generating system of claim 1, wherein the shape model generating unit selects, from a plurality of bone structure shape models prepared in advance in accordance with a facial bone structure, a basic head portion shape model similar to the facial bone structure on the basis of the characteristic points of the facial bone structure, selects, from a plurality of part shape models prepared in advance to correspond to a predetermined face part except for the facial bone structure, lookalike part shape models similar to the predetermined face parts on the basis of the characteristic points of the predetermined face parts, and generates the head portion shape model by combining the selected basic head portion shape model and the lookalike part shape models.

8. The character generating system of claim 1, wherein the shape model generating unit selects, from a plurality of reference shape models prepared in advance in accordance with a facial bone structure, the head portion shape model similar to the facial bone structure on the basis of the characteristic points of the facial bone structure.

9. The character generating system of claim 1, wherein the computer further includes a display control unit that causes the display unit to display face arrangement guide information showing an arrangement of predetermined face parts as well as the object on the display unit, and an image pickup control unit that causes an image pickup unit to pick up an image of the object and to store the pickup image information of the object in the predetermined storing unit, the pickup image acquiring unit connects the display control unit and the image pickup control unit, acquiring the face pickup image information of the object by picking up the image of the object on the basis of the face arrangement guide information from the pickup image information of the object stored in the predetermined storing unit while displaying the face arrangement guide information and the object on the display unit.

10. The character generating system of claim 1, wherein the computer further includes an input control unit that causes an input unit to take in various pieces of information including the pickup image information of the object as input information and to store the pickup image information of the object in the predetermined storing unit, the pickup image acquiring unit connects the display control unit and the input control unit, acquiring the face pickup image information of the object based on the face arrangement guide information from the pickup image information of the object stored in the predetermined storing unit while displaying the face arrangement guide information and the input pickup image information of the object on the display unit.

11. The character generating system of claim 9, wherein the predetermined face parts, the arrangement of which is represented by the face arrangement guide information, include at least a facial bone structure.

12. A character generating method that generates a face of a character displayed on a display unit as a presence in a virtual space by using a computer as an anime-like portrait based on face pickup image information of an object, wherein the computer performs:
(a) the step of acquiring the face pickup image information of the object from pickup image information of the object stored in a predetermined storing section;
(b) the step of acquiring position information of the characteristic points of predetermined face parts from the face pickup image information of the object acquired in the step (a) and acquiring the color information of the predetermined pixels;
(c) the step of generating a head portion shape model of the character on the basis of the characteristic points of the predetermined face parts acquired in the step (a);
(d) the step of setting lookalike flesh color information for a head portion texture of the character similar to the flesh color of the photographed object on the basis of the color information of the predetermined pixels acquired in the step (a), and furthermore, selecting lookalike anime-like parts similar to the corresponding face parts of the object on the basis of the characteristic points acquired in the step (a), and setting an arrangement of the selected lookalike anime-like parts to generate a face part texture corresponding to the face part;
(e) the step of pasting the face part texture generated by the step (d) to the head portion shape model of the character and replacing color information of a skin portion of the head portion texture pasted to the head portion shape model generated in the step (c) with the lookalike flesh color information set in the step (d).

13. The character generating method of claim 12, wherein the step (d) includes:
(d1) the step of, on the basis of the position information of characteristic points acquired in the step (b), selecting the lookalike anime-like parts similar to the shapes of the face parts of the object from a plurality of anime-like parts prepared in advance to correspond to a face part;
(d2) the step of, on the basis of the color information of predetermined pixels acquired in the step (b), selecting the lookalike flesh color information similar to the flesh color of the object from a plurality of flesh color settings prepared in advance; and
(d3) the step of, on the basis of the position information of characteristic points acquired in the step (b), setting an arrangement of the lookalike anime-like parts corresponding to face parts selected in the step (d1) and generating the face part texture on the basis of the arrangement of the set lookalike anime-like parts.

14. The character generating method of claim 13, wherein the step (d1)
when the face part is composed of two left and right basic face parts, converts position information of the characteristic points of either of the left or right basic face parts into position information in which the characteristic points are moved to positions axisymmetrical about a face center line, estimates a shape of the basic face parts from an average value of the position information of the characteristic points of the two left and right basic face parts, and selects the lookalike anime-like part corresponding to the estimated shape of the basic face parts from the plurality of anime-like parts, and
when the face part is composed of one basic face part, estimates a shape of the face part from position information of the characteristic points of the face part and selects the lookalike anime-like part corresponding to the estimated shape of the face part from the plurality of anime-like parts.

15. The character generating method of claim 13, wherein the step (d3)
for face part textures corresponding to face parts for which positions pasted to the head portion shape model are set in advance,
arranges the lookalike anime-like part of a nose and the lookalike anime-like part of a mouth at preset positions in the face part textures of the nose and the mouth,
arranges the lookalike anime-like parts of the left and right eyes axisymmetrically about the face center line, at an interval between the left and right eyes calculated from the position information of the characteristic points at preset vertical positions, in the face part texture of the eyes,
arranges the lookalike anime-like parts of left and right eyebrows axisymmetrically about the face center line at preset crosswise positions in the face part texture of the eyebrows and vertical positions calculated from the position information of the characteristic points, and
on the basis of the arrangement of the lookalike anime-like parts corresponding to the nose, the mouth, the eyes, and the eyebrows, generates the face part textures corresponding to the nose, the mouth, the eyes, and the eyebrows.

16. The character generating method of claim 13, wherein the step (d3)
for face part textures corresponding to face parts for which positions pasted to the head portion shape model are set in advance,
calculates the positions of lookalike anime-like parts in face part textures that correspond to face parts on the basis of the position information of characteristic points acquired in the step (b) and
generates face part textures on the basis of the calculated positions of the lookalike anime-like parts.

17. The character generating method of claim 15, wherein the step (d3)
selects a lookalike model face part texture with a similar arrangement of lookalike anime-like parts that correspond to face parts from a plurality of model face part textures corresponding to face parts and sets the selected lookalike model face part texture as the face part texture.

18. The character generating method of claim 12, wherein the step (c)
selects, from a plurality of bone structure shape models prepared in advance to correspond to a facial bone structure, a basic head portion shape model similar to the facial bone structure on the basis of the characteristic points of the facial bone structure,
selects, from a plurality of part shape models prepared in advance to correspond to a predetermined face part, exclusive of the facial bone structure, lookalike part shape models similar to predetermined face parts on the basis of the characteristic points of the predetermined face parts, and generates the head portion shape model by combining the selected basic head portion shape model and the looka-like part shape models.

19. The character generating method of claim 12, wherein the step (c)

selects, from a plurality of reference shape models prepared in advance to correspond to a facial bone structure, the head portion shape model similar to the facial bone structure on the basis of the characteristic points of the facial bone structure.

20. The character generating method according to claim 12, wherein the computer further includes the step (f) of, while displaying face arrangement guide information showing an arrangement of predetermined face parts as well as the object on the display unit, picking up an image of the object on the basis of the face arrangement guide information and storing the pickup image information of the object in the predetermined storing unit before the step (a), and a method in the step (a) of acquiring the face pickup image information of the object on the basis of the face arrangement guide information from the pickup image information of the object stored in the predetermined storing unit.

21. The character generating method of claim 12, wherein the computer further includes the step (g) of inputting the pickup image information of the object and storing the pickup image information in the predetermined storing unit before the step (a), and a method in the step (a) of, while displaying on the display unit the face arrangement guide information showing an arrangement of predetermined face parts as well as the pickup image information of the object input in the step (g), acquiring the face pickup image information of the object on the basis of the face arrangement guide information from the pickup image information of the object stored in the predetermined storing unit.

22. The character generating method of claim 20, wherein the arrangement of predetermined face parts is shown by the face arrangement guide information and the predetermined face parts include at least a facial bone structure.

23. A program that causes a computer to execute a process of generating a face of a character displayed as the presence in a virtual space on a display unit as an anime-like portrait based on face pickup image information of an object, wherein the computer is caused to execute processing to realize the units of the character generating system noted in claim 1.

* * * * *